May 14, 1968  R. N. SILVA  3,382,980
OZONE WATER TREATMENT PLANT
Filed Oct. 29, 1964  4 Sheets-Sheet 1

INVENTOR
RENE' N. SILVA

BY
Cameron, Kerkam & Sutton
ATTORNEYS

May 14, 1968 R. N. SILVA 3,382,980
OZONE WATER TREATMENT PLANT
Filed Oct. 29, 1964 4 Sheets-Sheet 2
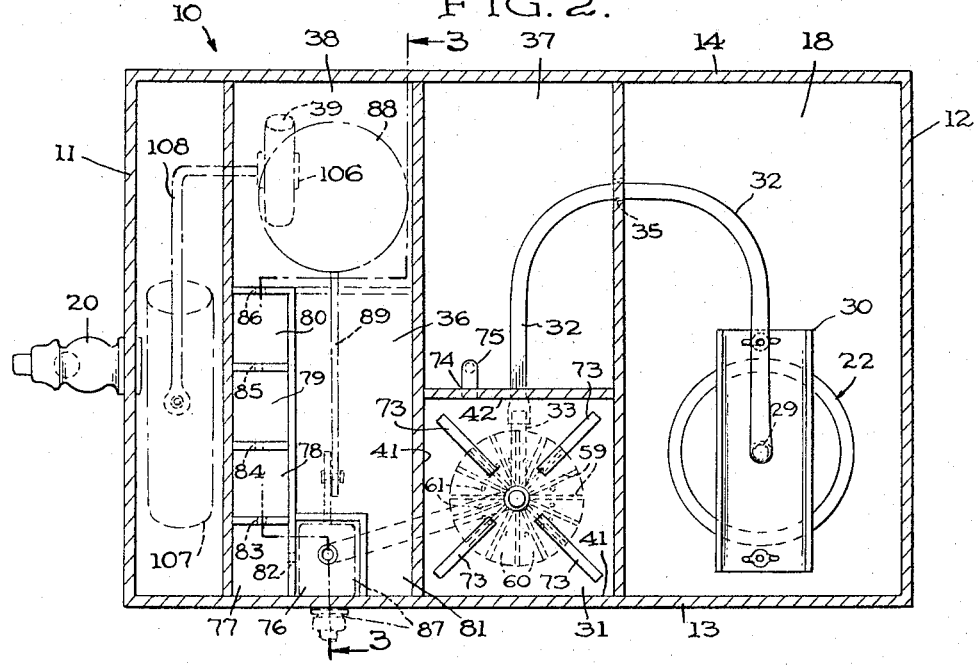
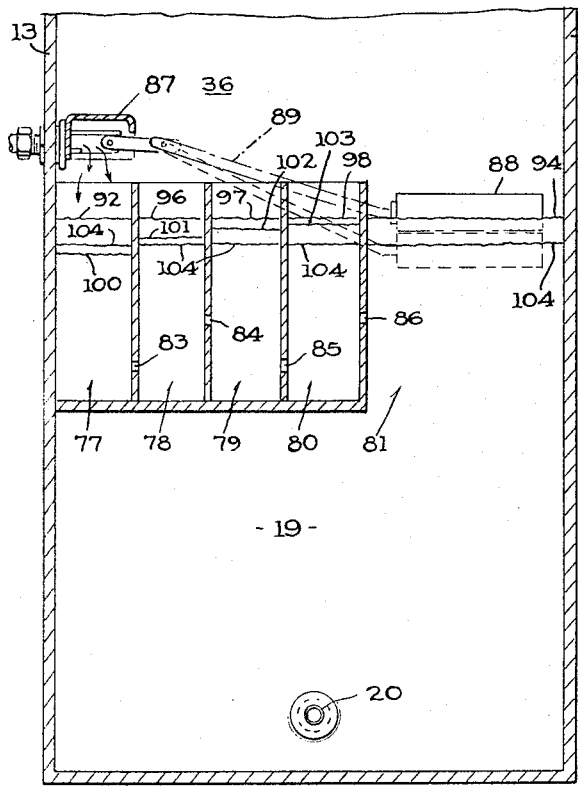
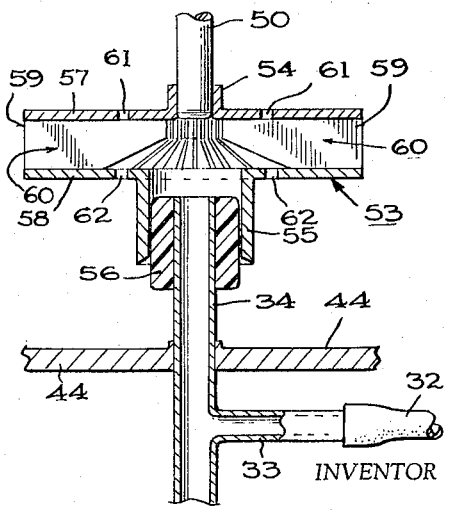
INVENTOR
RENE' N. SILVA
BY Cameron, Kerkam & Sutton
ATTORNEYS INVENTOR
RENE' N. SILVA
BY
Cameron, Kerkam & Sutton
ATTORNEYS May 14, 1968 R. N. SILVA 3,382,980
OZONE WATER TREATMENT PLANT
Filed Oct. 29, 1964 4 Sheets-Sheet 4
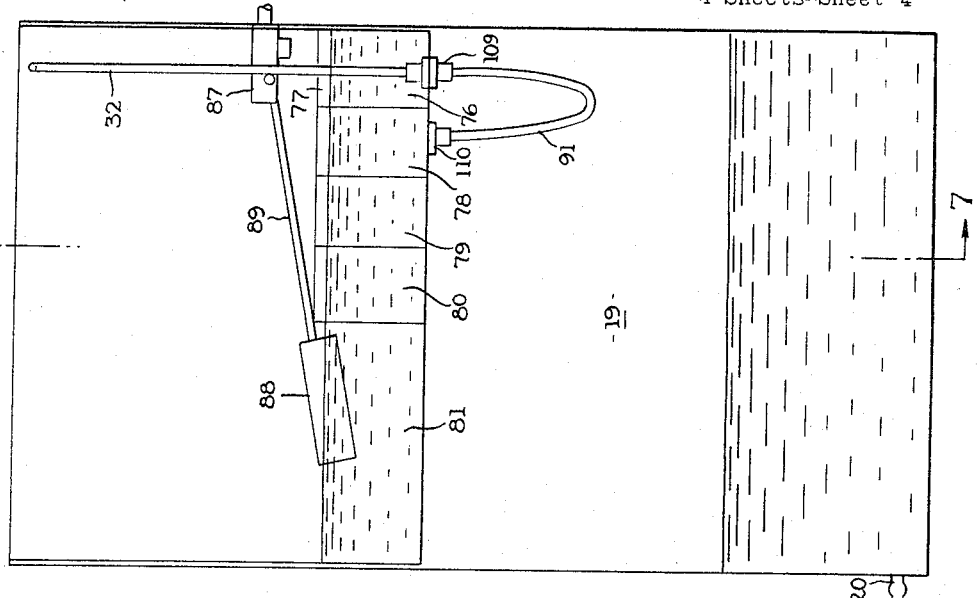
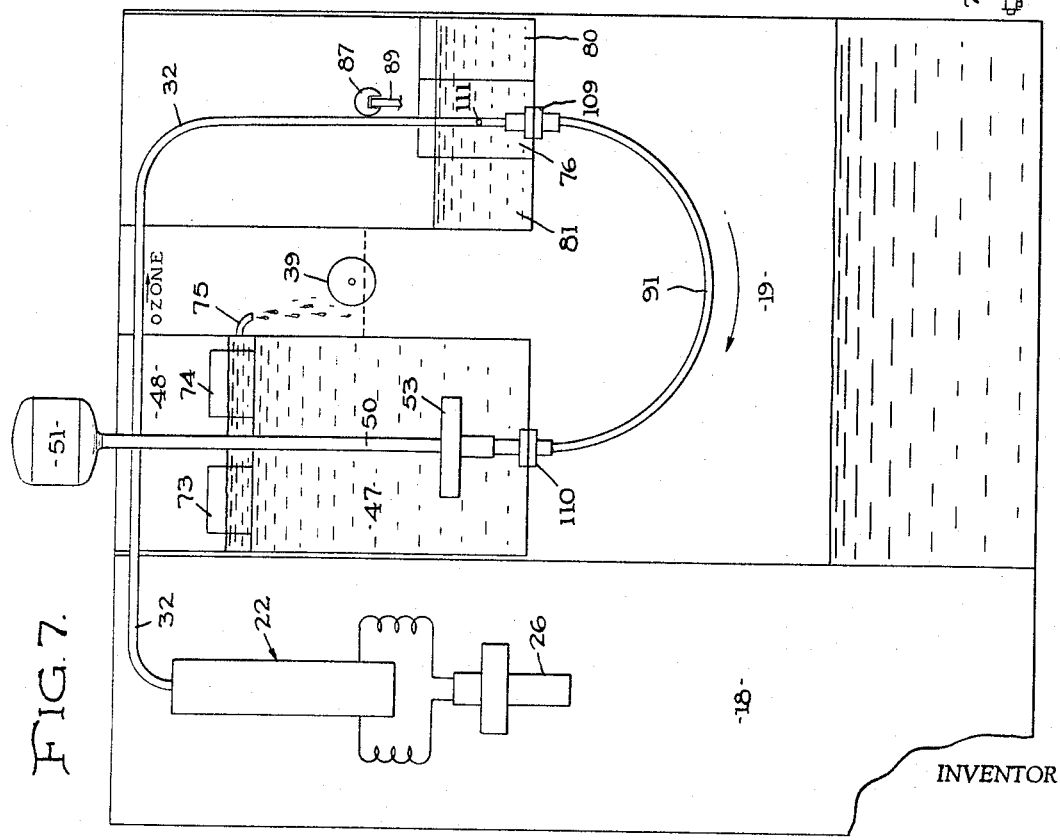
INVENTOR
RENÉ N. SILVA
BY
Cameron, Kerkam & Sutton
ATTORNEYS United States Patent Office 3,382,980
Patented May 14, 1968

3,382,980
OZONE WATER TREATMENT PLANT
Rene N. Silva, Philadelphia, Pa., assignor to The Welsbach Corporation, Philadelphia, Pa., a corporation of Delaware
Filed Oct. 29, 1964, Ser. No. 407,486
5 Claims. (Cl. 210—123)

ABSTRACT OF THE DISCLOSURE

A plant for treatment of water with ozone has a chamber for storing raw water, a mixing chamber, a storage chamber for heating water and an ozone generator. The flow of raw water to the mixing chamber and the flow of water from the mixing chamber to the storage chamber is slow at start-up until full ozone production is obtained. Structure to slow the feed of raw water may comprise a number of compartments interconnected by restricted orifices which regulate the flow of raw water between the compartments.

This invention relates generally to apparatus for purifying water and more particularly to a water treatment plant for the sterilization, purification and other treatment of water.

In general, in many areas of the world, a serious water purification problem has long existed. The water from available sources is often contaminated, of extremely bad taste and odor, is frequently acidic, contains objectional amounts of iron and other metal etc. Many and various proposals have been made and many tried to purify local water, yet bad water still persists as a general widespread problem, especially in areas not served by large city water systems.

The principle of effecting the removal of contained gases and/or minerals from liquids through the addition of chemicals, the mixing of air with such liquids, or through the passage of ozone through such liquids for the purpose of affecting bacteria and organic matter is, of course, well known. However, the methods and apparatus designed to carry out such treatment of water has been subject to many disadvantages. Generally, the use of chemicals is expensive and often results in an undesirable taste in the water, while apparatus for purifying water is often complex in nature and requires many moving parts and power driven components such as blowers, fans, coolers, driers, etc. The maintenance of these moving parts, as well as the long retention period required after aeration to effect the required oxidation of the contained gases or minerals results in apparatus which is inefficient, in that it produces an incomplete amount of oxidation, or which is so cumbersome and expensive as to be unsuitable for household installation and operation.

Another disadvantage of commercial water purifiers or treatment plants is that when the water treatment plant is shut down and not in use for long periods of time, such as will normally occur, for example, in households or manufacturing plants during vacation periods, there is a certain quantity of raw water retained in the treatmnet plant. Unless some means are provided to treat this raw water prior to its being mixed with previously purified water, which mixing would occur upon resumption of operation of the water treatment plant, the raw water will contaminate the stored pure water supply. It can be readily appreciated that such an arrangement, were it allowed to exist, would present a serious health hazard.

Yet another disadvantage of commercial water purifiers using ozonators results from the fact that the amount of ozone produced varies according to climatic conditions. In dry areas, ozonators operate more efficiently and thus the quantity of ozone produced in a given period of time is greater than that which would be produced in areas of high humidity. Water with the same bacteria count in a dry area will require the same amount of ozone to purify it as in a wet humid area; however, in dry areas the quantity of ozone produced is greater in the same given time. Accordingly, it is desirable to control the initial contact of raw water with ozone so that the mixing will not take place until there is a sufficient quantity of ozone available to purify the water and also control the amount of ozone in relation to the degree of water pollution and output capacity of the water treatment plant.

These and other disadvantages are overcome by the small, compact and fully automatic ozone water treatment plant embodying the present invention which may be used domestically for the sterilization and purification and other treatment of water, and which includes a new and novel arrangement for mixing of the water and ozone. The novel mixing arrangement improves the circulating efficiency and the aerating efficiency over known apparatus used in the treatment of raw water with ozone and also provides a delay before subjecting raw water to treatment with ozone as well as delaying the initial passage of the treated water into the storage chambers. By delaying the treatment of raw water with ozone, the ozone generating unit is allowed to warm up sufficiently so as to ensure an adequate supply of ozone to effect purification of the raw water. Further, in the present invention, any raw water retained in a water treatmnet plant is subjected to full ozonation prior to being translated for storage. The apparatus of the present invention is economical in construction, efficient in operation and assures at all times the purification of raw water and the removal of objectional taste and odors therefrom.

Accordingly, it is an object of the present invention to provide an improved water treatment plant which is compact and economical in construction and which will operate automatically and efficiently with a minimum of attention and maintenance.

Another object of the present invention is to provide an improved water treatment plant which will purify and sterilize water without the necessity of chemicals, such as inhibitors, flocculating agents, etc., added to the water.

Another object of the present invention is to provide an improved water treatment plant in which the intermixing of ozone and water may be delayed until the ozonator has had a sufficient warm-up period.

A further object of the present invention is to provide an improved mixing chamber for inter-mixing raw water and ozone.

In accordance with the present invention, in one embodiment thereof, there is provided a fully automatic and compact ozone water treatment plant having a novel feeding arrangement for raw or contaminated water which slows up the flow of the raw water that is to be mixed with ozone so as to ensure that the ozone generating unit is supplying an adequate quantity of ozone for purification of the contaminated water. To this end, the feeding arrangement comprises a plurality of compartments interconnected by means of controlled diameter orifices which regulate the flow of raw water between the compartments so as to establish a desired time lapse or delay time of approximately 2 to 15 minutes.

In accordance with another feature of the present invention, there is provided a novel mixing unit in which, after the ozone and raw water are subjected to pre-ozonation, the ozone and raw water are continuously re-circulated to ensure complete oxidation of the contained gases, minerals and organic matter. To prevent contamination of the treated water during periods of long shut-downs, the level of the water within the mixing unit, when the water treatment plant is deenergized, is maintained slightly above the impeller so that only a slight suction is created upon initial rotation of the impeller. As the water level in the mixing unit rises, the force of the suction correspondingly increases until the water level within the mixing unit is raised sufficiently so as to be discharged through a spout to the storage chamber for the pure water. In this manner, a delay is established before the water enters the storage chamber to ensure that the stored water is maintained of good quality at all times.

While the specification concludes with claims particularly pointing out and distinctly claiming the subject matter regarding the invention, it is believed that the invention will be better understood from the following description taken in connection with the accompanying drawings.

FIG. 2 is a horizontal cross section view of the improved water treatment plant of the present invention taken along lines 2—2 of FIG. 1;

FIG. 3 is a cross section view of the improved water treatment plant of the present invention taken along lines 3—3 of FIG. 2;

FIG 4 is a fragmentary view partially in cross section, of the mixing chamber of the present invention particularly illustrating the impeller arrangement;

FIGS. 7 and 8 are diagrammatical illustrations of an alternate embodiment of the present invention.

Figure 1:
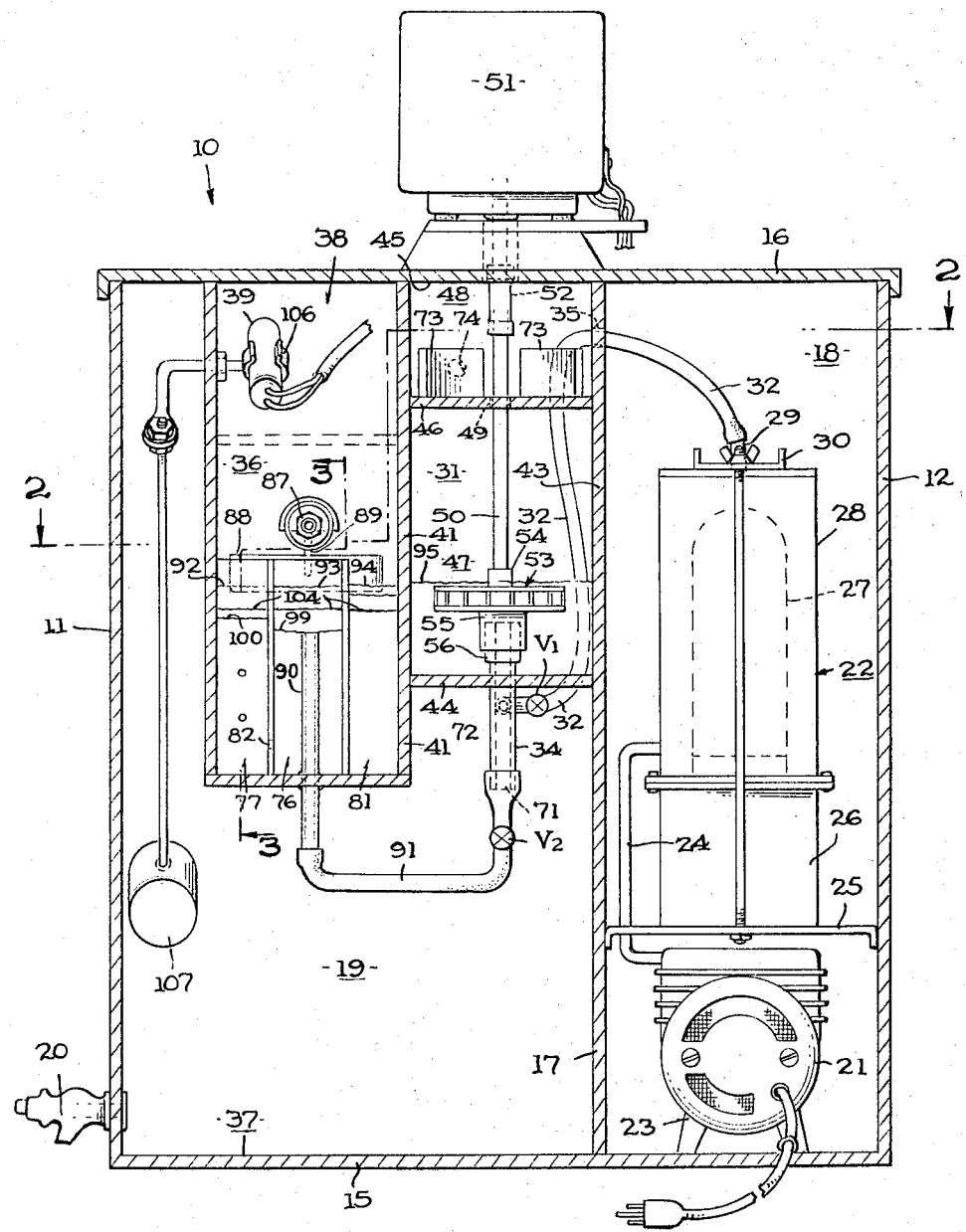
FIG. 1 is a cross section view of the improved water treatment plant of the present invention with certain parts shown in elevation.

Referring now to the drawings, and in particular to FIGS. 1–3, there is illustrated the fully automatic and compact ozone water treatment plant 10 embodied in this invention. The water treatment plant 10 is housed within a cabinet comprising vertical sidewalls 11, 12, 13, and 14, a base 15 and a cover 16. The cabinet is conveniently compartmentalized by means of a vertical section plate 17 to form two separate compartments 18 and 19, and a suitable valve 20 is mounted in wall 11 to draw treated water out of the unit as desired.

The first compartment 18 houses an ozone generating unit 22 which may be of conventional design selected in accordance with the output requirements of the water treatment plant. One such ozone generating unit which is shown by way of example, may be of the type illustrated and described in a prior copending application Ser. No. 308,498, filed on Sept. 12, 1963, now abandoned, jointly by Gerard M. Salazar and myself. However, other forms of ozonators may equally well be utilized. Accordingly, its operation and structure will not be described in detail.

Such an ozone generating unit generally includes a compressor 21 conveniently secured to the base 15 by means of brackets 23 in any convenient manner. A suitable opening (not shown), such as a window or louver, is provided in that portion of the wall 13 nearest the compressor intake to allow air to be drawn into the compressor. The low pressure, compressed air output of the compressor is translated through a conduit or tube 24 to the air inlet of the ozone generating unit 22. The ozone generating unit 22 is conveniently supported on bracket 25 toward one side of the compartment 18 to provide maximum storage space for the treated water. Ozone generating unit 22 comprises a transformer 26 mounted on the mounting plate 25 and one or more dielectric tubes 27 within the casing 28 arranged for producing the ozone. Fitting 29 supported on the casing 28 has connected thereto a conduit or tubing 32 which maintains the ozone generating unit in communication with the mixing chamber 31.

When the ozone generating unit is energized, ozone is conducted through tubing 32 to the mixing chamber 31 located within compartment 19 through a T-connection which establishes a pre-ozonization condition. To this end, the other end of tubing 32 is affixed to the trunk 33 of the T. One end of arm 34 of the T-connection leads into the mixing chamber 31, while the contaminated water is drawn into the other end of the arm 34.

In operation, upon rotation of the impeller within the mixing unit, a suction is created which draws the ozone and contaminated water within the T-connection. Due to this suction, a sufficient drawing force for the ozone is created so as to obviate the need for the aforementioned compressor 21. In such an arrangement, a suitable air filter is provided adjacent the louver opening to prevent dust and dirt particles from entering through the air inlet into the ozone generating unit 22.

The orifice inlet for the ozone in trunk 33 is advantageously made smaller than the orifice inlet for the contaminated water in arm 34 to ensure better mixing; however, the size of the orifices are dependent upon the operating conditions for the water treatment plant such as, for example, the capacity of the plant and the quality of water being treated. For a location where water pollution is lower than the average, the capacity of the plant can be increased by providing a water orifice of larger diameter. On the other hand, for location where water pollution is greater than the average, a greater quantity of ozone is required to maintain an adequate standard of purity and, consequently, the size of the ozone orifice is increased.

In one embodiment of the present invention for a plant of moderate capacity and having a rural water input of high pollution, the raw water orifice is provided with a diameter of 0.0465 inch and the ozonated air orifice is provided with a diameter of 0.035 inch. With the impeller revolutions set at 1500 r.p.m., the water flow rate into the T-connection is maintained at approximately 5.3 liters per hour and the ozonated air flow rate is maintained at approximately 1.59 liters per minute. These flows are maintained constant as long as the r.p.m. of the impellers is constant. But, if the raw water pollution is low, the water flow could be increased up to 20 liters per hour by increasing the diameter of the raw water orifice.

Since the contamination of water varies at different geographical locations, and since the required capacity of the plant may vary in accordance with the particular use, it is desirable to provide means for conveniently adjusting the flow rate of ozonated air and raw water into the T-connection. To this end, the raw water flow conduit 91 and the ozonated air conduit 32 are provided with regulating flow valves V1 and V2, respectively, for adjustably controlling the flow therethrough.

In such an arrangement, assuming a water treatment plant having an ozonator output of approximately 70 milligrams per hour of ozone, the raw water input, assuming a safety factor of two, can be varied between 5 and 10 liters per hour and the flow of ozonated air can be varied between .5 and 1.9 liters per minute. This range of operation provides satisfactory results for even a heavily polluted raw water input for a water treatment plant having an output capacity of approximately 20 liters per hour. It can be readily appreciated, that for larger or smaller size plants, the relative sizes of the orifices and the corresponding flow rates are increased or decreased, as the case may be, to correspond to the capacity of the plant; however, the size of the orifice inlet for the ozonated air is advantageously maintained smaller than that of the orifice inlet for the water to ensure better mixing.

Since the water drawn to the hollow shaft 34 will establish in a mixing chamber a certain head pressure, tubing 32 is arranged so that a part thereof is at a height greater than the highest reached by the water in the mixing chamber to prevent any back-flow of water into the ozone generating unit. Accordingly, tubing 32 is passed through the upper end of vertical section plate 17 adjacent to cover 16.

The second compartment 19 is further compartmentalized to provide: a mixing chamber 31 wherein the pre-ozonated mixture is further mixed, intermingled and circulated; a contaminated water flow chamber 36 which delays the entrance of contaminated water into the mixing chamber until the ozone generating unit has been energized a sufficient time to establish an adequate flow of ozone for purifying the water; a storage chamber 37 for storing the purified water and an isolating chamber 38 which houses a float operated switch 39 arranged to automatically energize the water treatment plant when the purified water in the storage chamber 37 falls below a predetermined level. It should be readily apparent that the several compartments and chambers are provided with adequate sealing means in a manner well known in the art to prevent leakage therebetween.

The mixing chamber 31 comprises side walls 40–43, base 44 and a horizontal section plate 46 arranged to form a lower and an upper section or compartment 47 and 48, respectively. The section plate 46 includes a centrally located large diameter opening 49 through which extends an impeller supporting shaft 50. The shaft 50 is of a diameter smaller than that of opening 49 and is supported for rotation by motor 51. To this end, the upper end of shaft 50 is connected to the driving shaft of the motor by coupling 52. Motor 51 is conveniently mounted on cover plate 45 and arranged to be energized upon closing of switch 39 to drive the shaft 50 at a speed of approximately 1500 r.p.m.

The lower end of shaft 50 supports an impeller 53 and is conveniently connected to hub 54. The lower hub 55 of the impeller is freely supported on bearing 56 which may be Teflon or the like to keep friction at a minimum upon rotation of the impeller. Bearing 56 is affixed to the hollow shaft 34 extending through and supported by base 44.

Referring to FIG. 4, the impeller 53 is shown in greater detail and comprises upper and lower spaced horizontal plates 57 and 58, respectively, which are separated by a plurality of radial partitions 59. The radial partitions 59 and upper and lower plates 57 and 58 form a plurality of radially disposed pockets 60 which are open at each end. The inner end of the radial partitions are cut-away to form an inlet for the radially disposed pockets, the boundaries of the inlet being in the form of a truncated cone. Upon rotation of the impeller, the shaped partitions cause the water and ozone mixture to be thrown outwardly and facilitate a more intimate mixing thereof.

Each of the upper and lower plates 57 and 58 of the impeller are provided with a plurality of spaced holes 61 and 62, respectively. The holes are arranged so that each of the pockets 60 formed between the radial partitions 59 and upper and lower plates has associated therewith a pair of holes. The holes 61 and 62 enable the water and ozone mixture to be drawn into their respective pockets 60 from the lower chamber 47 of the mixing chamber 31 by the suction created upon rotation of the impeller 53.

The diameter of the holes are set and must be large enough to prevent clogging from dirt, yet small enough to effect bubbling of the ozone as it is passed into the mixing chamber. Advantageously, the holes are maintained between 0.035 inch and 0.075 inch; however, optimum results are obtained when the diameter of the impeller holes are maintained at 0.0465. Although the quantity of holes and the quantity of radial partitions may be varied, the diameter of the holes, in order to maintain the desired results, are maintained with the prescribed limits.

Figure 5:
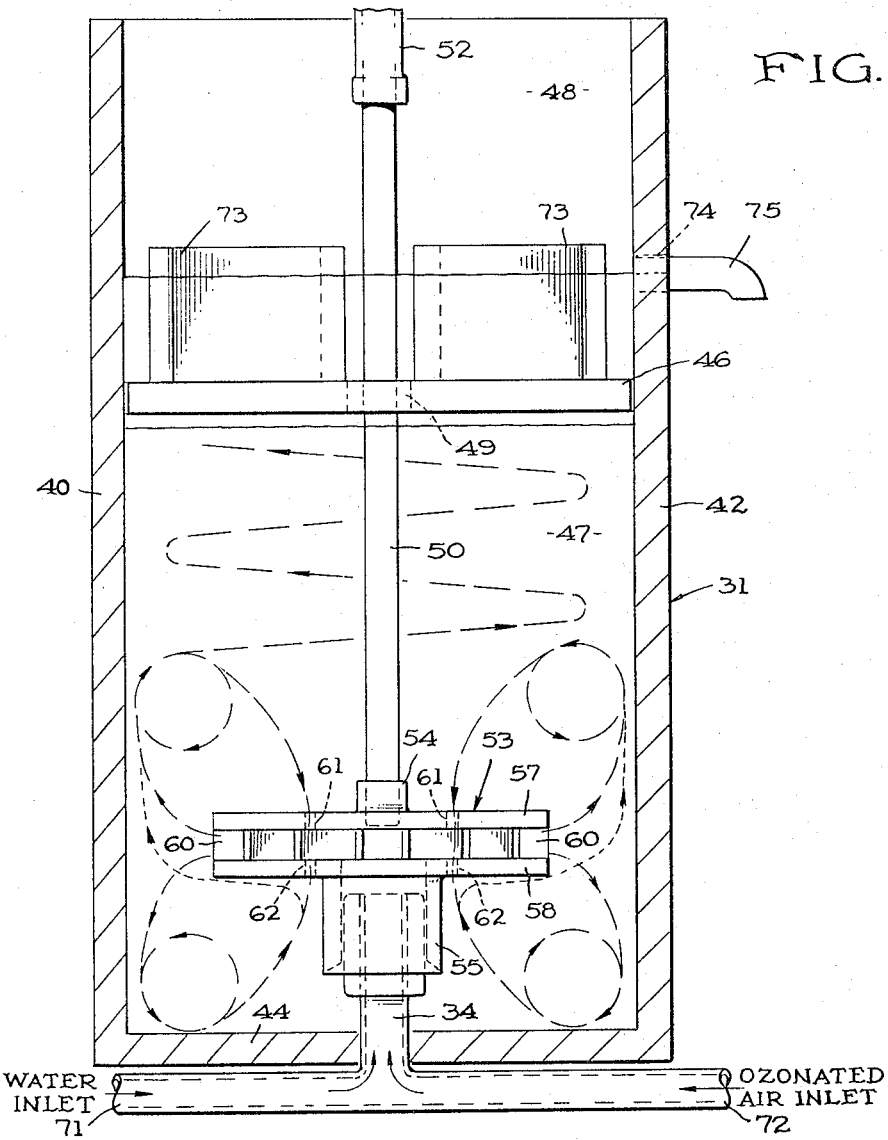
FIG. 5 is a diagrammatic view of the mixing chamber of the present invention illustrating the flow paths of the water and ozone.

Referring to FIG. 5 there is illsutrated the flow paths for the liquid and gas circulation and recirculation which takes place within the mixing chamber 31 as indicated by the arrows. There are, of course, no sharply defined flow paths as indicated by the arrows, and these arrows merely indicate the general visual observation of the flow.

The contaminated water enters at inlet 71 while ozone or an ozone and air mixture enters at inlet 72, the ozone and water being mixed within the hollow shaft 34 to establish a pre-ozonation condition. As the impeller 53 rotates, a suction is created which draws up this mixture through the shaped opening formed by the cut away sections of the radial partitions 59. The centrifugal force created by the rotating impeller 53 pushes the mixture through the pockets 60 and out of the impeller. Part of the mixture follows an upward path while another part of the mixture follows a downward path. Referring to the flow paths illustrated at the left side of chamber 47, a portion of the mixture that follows the downward path comes back into the impeller 53 through the holes 62 on the lower horizontal plate 58, while the rest of the mixture follows the counterclockwise whirling path as shown by the dotted lines. A portion of the part of the mixture that follows the upward path comes back into the impeller through the holes 61 on the upper horizontal plate 57, while the rest of the portion of the mixture moves in the clockwise whirling motion as shown by the arrows. Since the impeller is constructed symmetrical about its axis, it can be readily appreciated that the arrows are merely a visual representation of one portion of the flow path and a similar flow occurs throughout the chamber 47 due to rotation of the impeller.

As the impeller continues to rotate, there is produced a whirling and swirling action within the lower chamber 47 with the bubbles of ozone rising toward the upper surface of the water. The water passes freely through opening 49 to the upper chamber 48; however, the horizontal section plate 46 serves to restrain the bubbles from freely coming up to the water surface. The mixture of water and ozone eventually all pass through the opening 49 and enters the upper chamber 48 which is arranged to stabilize the whirling action. To this end, there is supported on the upper surface of the horizontal plate 46 a plurality of radially disposed baffles 73 which are spaced from each other so as to allow free movement of the water and ozone in the upper chamber 48, but which stop or stabilize whirling at the upper part of the liquid that is in contact with the atmosphere. This avoids air being drawn into the mixture. As the water level continues to rise, it reaches the opening 74 and passes through spout 75 into the storage chamber 37.

As hereinbefore mentioned, the contaminated water entering water inlet 71 is slowed up until the ozone generating unit has had a sufficient time to warm up and provide an adequate supply of ozone for purifying of the water. To this end, there is provided a flow control chamber 36 comprising a plurality of compartments 76–81 which are interconnected by orifices 82, 83, 84, 85 and 86. A float operated water valve 87 is positioned above compartment 76 and is operatively connected to float 88 by shaft 89 to cause the contaminated water to flow into the compartment 76 when the level in the flow control chamber 36 drops below a predetermined amount. This ensures an adequate supply of purified water in the storage chamber at all times. Hollow shaft 90 which has a diameter greater than that of the orifices is positioned within compartment 76 and extends therethrough for connection to the water inlet 71 by tubing 91. Advantageously, the diameter of the orifices 82–86 is made approximately 0.104 inch, but can be varied slightly depending on the desired delay which is normally maintained between 2 and 15 minutes.

In operation, assuming the water treatment plant has not been energized for a period of time, the water levels, referring to FIGS. 1 and 3, are stabilized in various compartments at 92, 93, 94, 95, 96, 97 and 98. The water level 95 is approximately ¼ inch to 1 inch above the impeller, and the water level of the raw water in chamber 36 is near the top of the compartments due to the volume of water displaced from the mixing chamber 31. These levels are maintained until the water level of the purified water in the chamber 37 lowers sufficiently to cause switch 39 to energize the ozonator and motor 15. This, in turn, causes impeller 53 to be driven at the speed of rotation of the motor; however, due to the low water level within the mixing chamber 31, the vacuum produced by the impeller is very small and the quantity of raw water drawn into the mixing chamber is small also. As the water level in the mixing chamber rises, a greater suction is developed and the quantity of water drawn into the mixing chamber tends to increase.

Besides this slow motion at the start of any cycle, the calibrated orifices of the interconnected compartments serve to slow down the flow of raw water from compartment 81. As the float valve 87 is regulated by the raw water in compartment 81, this maintains the float valve closed for a longer period of time than it would otherwise be if the flow were not slowed down.

Immediately after the impeller 53 starts its suction, the water level in compartment 76 is lowered. Compartments 76 and 77 are interconnected by orifice 82. Thus water begins to flow from compartment 77 to 76. A similar development takes place between compartments 77 and 78, 78 and 79, 79 and 80, and 80 and 81 through orifices 83, 84, 85 and 86, respectively. After a short period of time the water levels in the several compartments change and will be at the levels indicated at 99, 100, 101, 102, 103 and 94, the amount of flow being controlled by the size of the orifices. From then on, the water level will tend to equalize at level 99, the time lapse is dependent on the quantity of flow. Eventually, as the water levels tend to equalize at level 99, level 94 in compartment 81 will start to lower and carry down float 88, thus causing valve 87 to open and feed water into compartment 76. The water level in compartment 76 rises above the hollow shaft 90 and feeds through the shaft and conduit 91 to the water inlet 71. The back pressure due to the increased head in compartment 76 tends to stop the flow of water from compartment 81 to 76 until all levels equalize at 104. As long as the purified water in the storage chamber 37 remains below the desired storage level, the contaminated water will continue to be supplied. However, when a sufficient quantity of water in the storage chamber is available, switch 39 will be closed de-energizing the impeller driving motor 51 and ozone generating unit. The water in mixing chamber 31 flows back through conduit 91 until the water level stabilizes at 92–98, which level is sufficient to cause float 88 to close valve 87. Thus, the process is continuous.

For automatic energization of the water treatment plant there is provided a float controlled switch 39 which may be of the mercury type. Switch 39 is tiltably supported in isolating chamber 38 by a suitable clamping mechanism 106 operatively connected to the float mechanism 107 by shaft 108. The float 107 is moved upwardly and downwardly according to the level of water within the storage chamber 37, and when the level recedes below a predetermined amount, the switch is closed to energize the ozone generating unit 22 and motor 51.

Figure 6:
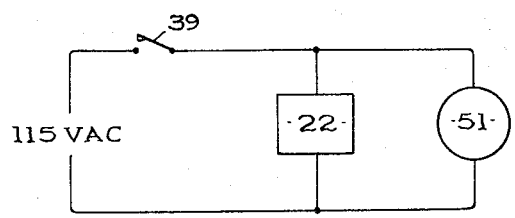
FIG. 6 is a schematic diagram of the electrical system for the water treatment plant of the present invention.

Referring to FIG. 6, there is illustrated schematically the electrical wiring diagram for the water treatment plant of the present invention. The ozone generating unit 22 and motor 51 are connected electrically in parallel and in turn to the source of energy, which may be a conventional household 115 v. A.C. source, through the switch 39. Thus, as switch 39 is closed, the ozone generating unit and motor are simultaneously operated to place the water treatment plant in operation.

Referring to FIGS. 7 and 8, there is diagrammatically illustrated an alternate embodiment of the water treatment plant of the present invention in which the T-connection leading into the mixing chamber 31 is replaced by a simplified conduit or tubing arrangement which maintains the ozonator in direct communication with the mixer. To this end, tubing 32 which has an inside diameter such as to establish the desired ozone flow rate is passed through compartment 76 and connected to one end of a bulkhead union 109. The other end of the union 109 has connected thereto one end of tubing 91 which has its other end connected to bulkhead union 110. Union 110 supports the lower hub 55 of the impeller in a manner similar to that of the T-fitting hereinbefore described. Tubing 32 is provided with a calibrated orifice 111 to release raw water into the tubing for mixing with the ozone. Orifice 111 is arranged at a height equal to that of conduit 90 and water level 99 shown in FIG. 1, and operation of the water treatment plant is as previously described.

The flow valve 87 maintains the same constant head (water level) in order to have a fixed water pressure at orifice 111. This fixed water pressure is necessary to maintain a constant water flow through the orifice during normal operation, the water flow being changed when a delay is provided upon initial energization of the water treatment plant as hereinbefore described. Through the orifice 111, water enters within tubing 32 and starts mixing with the ozone. The ozone and water then pass through tubing 91 and establish a pre-ozonization condition before it is translated to the impeller 53 where the mixing of ozone and water is thrown off producing a very finely dispersed mixture which helps with the reaction of the ozone with the water. The purified or treated water from the mixing chamber 48 is passed through spout 75 into the storage chamber 19 from where it may be withdrawn by a consumer.

Since the orifice 111 is located directly in the tubing 32, the flow of water into the tubing cannot be varied for any particular tubing, however, the tubing 32 may be readily replaced with a calibrated orifice of different diameter and the inside diameter of the tubing may also be selected in accordance with the particular desired flow rate of the ozone.

Although several embodiments of the present invention have been described, many modifications may be made, and it is intended by the appended claims to cover all such modifications which fall within the true spirit and scope of the invention.

What is claimed is:

1. An ozone water treatment plant for purifying raw water by treatment with ozone comprising a housing having a first chamber in communication with the source of raw water, means establishing a water level in said first chamber, an ozone generating unit for providing the source of ozone, a mixing chamber, means for translating ozone and raw water from said ozone generating unit and said first chamber, respectively, to said mixing chamber, a storage chamber arranged to receive treated water from said mixing chamber and means to initially slow the feed of said raw water to said mixing chamber, said means to slow the feed of raw water comprising a plurality of compartments arranged within said first chamber and in fluid communication with said mixing chamber and said first chamber, one of said compartments being in communication with the raw water source, means responsive to a predetermined lowering of water in said first chamber to initiate flow from the raw water source, restricted openings interconnecting said compartments, one to another, for establishing a flow path for said raw water from said first chamber through said compartments to said mixing chamber constructed and arranged so that the water flow from said first chamber to said mixing chamber is slowed.

2. An ozone water treatment plant for purifying a source of raw water with ozone comprising a housing having a first chamber in communication with the source of raw water, means establishing a water level in said first chamber, an ozone generating unit for providing a source of ozone, a mixing chamber, means for translating ozone and raw water from said ozone generating unit and said first chamber, respectively, to said mixing chamber, a storage chamber arranged to receive treated water from said mixing chamber and means to delay the passage of treated water from said mixing chamber to said storage chamber upon initial energization of said ozone generating unit, said first chamber including a plurality of compartments, one of said compartments being in communication with the raw water source, means responsive to a predetermined lowering of water in said first chamber to initiate flow from the raw water source, said compartments being interconnected through restricted orifices for establishing a flow path for said raw water through said compartments to said mixing chamber and retarding the flow of raw water to said mixing chamber.

3. The ozone water treatment plant as set forth in claim 2 wherein said one of said compartments of said plurality of interconnected compartments is in communication with the raw water source and is connected to said mixing chamber, said connection to said mixing chamber establishing an initial water level in said one compartment upon energization of said ozone generating unit to slow treatment of raw water with ozone in said mixing chamber until the predetermined lowering of water in said first chamber is attained.

4. The ozone water treatment plant as set forth in claim 3 wherein said initial water level established in said one compartment is lower than the water level in each of the other compartments in said first chamber so that the raw water from the other compartments in said first chamber is caused to seek a new level, and wherein the responsive means includes a float control valve.

5. The ozone water treatment plant as set forth in claim 2 wherein one of said compartments is connected to said mixing chamber through an orifice having a diameter smaller than that of any other of said orifices.

References Cited

UNITED STATES PATENTS

| | | | |
|---|---|---|---|
| 837,107 | 11/1906 | Otto | 210—192 X |
| 1,047,534 | 12/1912 | Joseph | 210—192 X |
| 1,363,589 | 12/1920 | Hartmena | 210—192 X |
| 1,374,445 | 4/1921 | Greenawalt | 261—87 |
| 1,374,446 | 4/1921 | Greenawalt | 261—87 |
| 2,074,403 | 3/1937 | Kraut | 261—93 |
| 2,405,553 | 8/1946 | Allison | 210—192 X |
| 2,767,965 | 10/1956 | Daman | 261—87 |
| 2,812,861 | 11/1957 | Bickford | 210—192 X |
| 3,202,281 | 8/1965 | Weston | 261—87 X |

FOREIGN PATENTS 199,352    8/1958    Austria.

REUBEN, FRIEDMAN, *Primary Examiner.*

SAMIH N. ZAHARNA, *Examiner.*

C. DITLOW, *Assistant Examiner.*